United States Patent
Boswell et al.

(10) Patent No.: US 9,506,369 B2
(45) Date of Patent: Nov. 29, 2016

(54) TIP CLEARANCE CONTROL FOR TURBINE BLADES

(75) Inventors: John H. Boswell, Derby (GB); Ian Tibbott, Lichfield (GB)

(73) Assignee: ROLLS-ROYCE PLC, London (GB)

( * ) Notice: Subject to any disclaimer, the term of this patent is extended or adjusted under 35 U.S.C. 154(b) by 1079 days.

(21) Appl. No.: 13/544,211

(22) Filed: Jul. 9, 2012

(65) Prior Publication Data

US 2013/0017060 A1    Jan. 17, 2013

(30) Foreign Application Priority Data

Jul. 15, 2011 (GB) .................................. 1112163.9

(51) Int. Cl.
    *F01D 11/24*      (2006.01)
    *F01D 25/14*      (2006.01)

(52) U.S. Cl.
    CPC ............. *F01D 11/24* (2013.01); *F01D 25/145* (2013.01); *Y02T 50/675* (2013.01)

(58) Field of Classification Search
    CPC ....... F01D 11/24; F01D 25/145; F01D 25/14
    See application file for complete search history.

(56) References Cited

U.S. PATENT DOCUMENTS

| | | | | |
|---|---|---|---|---|
| 4,524,998 A | * | 6/1985 | Brisco ........................... | 285/101 |
| 2008/0193278 A1 | * | 8/2008 | Erickson et al. ............. | 415/115 |
| 2011/0229306 A1 | * | 9/2011 | Lewis et al. ................. | 415/115 |

FOREIGN PATENT DOCUMENTS

| EP | 0 102 308 A1 | 3/1984 |
|---|---|---|
| EP | 2 372 105 A2 | 10/2011 |

OTHER PUBLICATIONS

British Search Report issued in British Patent Application No. 1112163.9 on Nov. 9, 2011.

* cited by examiner

*Primary Examiner* — Richard Edgar
*Assistant Examiner* — Jeffrey A Brownson
(74) *Attorney, Agent, or Firm* — Oliff PLC

(57) ABSTRACT

An arrangement for heating and cooling a turbine casing of a gas turbine engine, the arrangement comprising an inboard duct, adjacent to an inboard surface of the turbine casing, an outboard facing wall of the inboard duct having a plurality of impingement holes opening towards the inboard surface of the casing, through which temperature control fluid can pass from within the inboard duct to impinge upon the inboard surface of the turbine casing.

4 Claims, 5 Drawing Sheets

Sectional View A-A

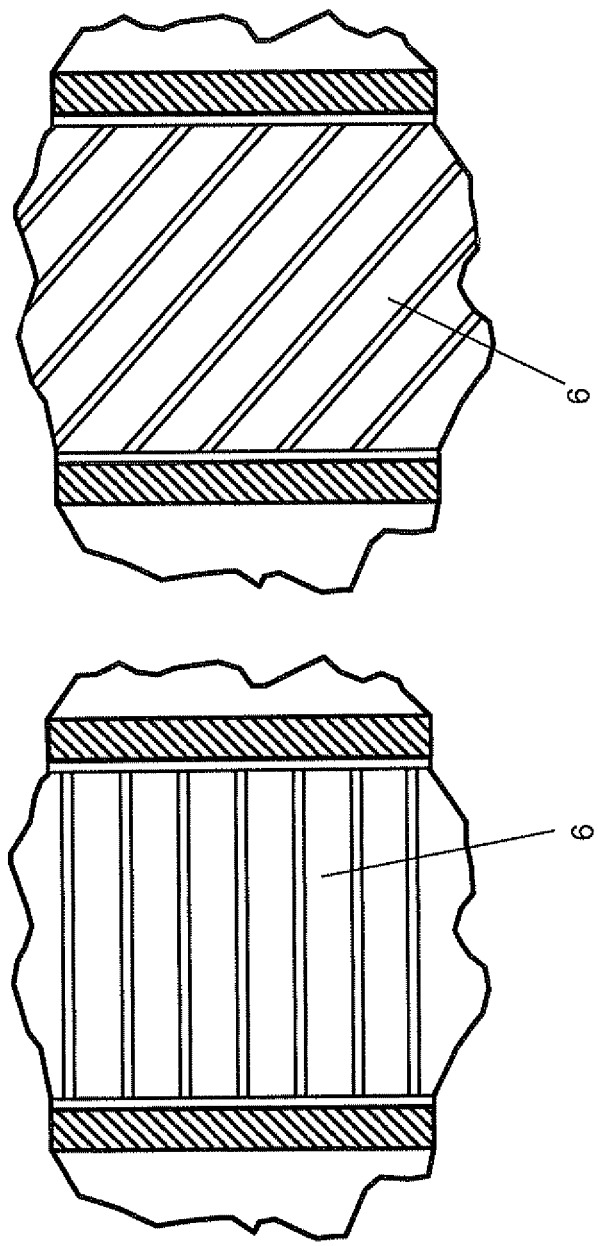

TIP CLEARANCE CONTROL FOR TURBINE BLADES

FIELD OF THE INVENTION

The present invention relates to controlling the tip clearance of rotating blades within a gas turbine by controlling the temperature of the turbine casing.

BACKGROUND OF THE INVENTION

Modern gas turbine engines, and more specifically turbofans for use in aviation, provide power by compressing air using a compressor, adding fuel to this compressed air, combusting this mixture such that it expands through the blades of a turbine and exhausting the produced gases. The turbine consists of a disc, rotating about the central shaft of the engine, and a plurality of blades extending radially out of the disc towards the engine casing of the engine. Expansion of the combustion gases through the turbine causes its blades to rotate at high speed and the turbine, in turn, drives the compressor.

The distance between the tips of the blades and the inner surface of the turbine casing is known as the tip clearance. It is desirable for the tips of the turbine blades to rotate as close to the engine casing without rubbing as possible because as the tip clearance increases, a portion of the expanded gas flow will pass through the tip clearance the efficiency of the turbine decreases as. This is known as over-tip leakage. The efficiency of the turbine, which partially depends upon tip clearance, directly affects the specific fuel consumption (SFC) of the engine. Accordingly, as tip clearance increases, SFC also rises.

As the disc and the blades of the turbine rotate, centrifugal and thermal loads cause the disc and blades to extend in the radial direction. The turbine casing also expands as it is heated but there is typically a mismatch in radial expansion between the disc/blades and the casing. Specifically, the blades will normally expand radially more quickly than the housing, reducing the tip clearance and potentially leading to "rubbing" as the tips of blade come into contact with the interior of the casing of the turbine. Over time in use, the casing heats up and expands away from the blade tip, increasing the tip clearance. This may result in a tip clearance at stabilised cruise conditions that is larger than desired resulting in poor efficiency.

Conventionally, tip clearances are set when the engine is cold to allow for radial extension of the turbine disc and blades due to centrifugal and thermal loads, to prevent rubbing. This means that there is initially a large tip clearance, such that the engine is relatively inefficient. When the engine is running, the blades will eventually extend radially to close this clearance, making the engine run more efficiently. Over a longer period of time, however, the temperature of the turbine casing will rise and the casing will expand radially, which will again increase the tip clearance.

Currently technology to overcome this problem uses a cooling duct extending around the circumferential outboard surface of the turbine casing, into which bypass air is fed to impinge on and cool the turbine casing during stabilised cruise conditions. By cooling the casing in this way the radial expansion of the casing is lessened and a smaller tip clearance is maintained.

However, this current approach to controlling tip clearance lacks the responsiveness required to maintain an appropriate tip clearance during transient parts of the flight profile, such as during take-off or step climb. Under these conditions, the disc and blades expand radially much more quickly than the casing, with the risk of rubs between the blade tip and the casing unless the tip clearance is set larger than would otherwise be desirable when the engine is cold.

SUMMARY OF THE INVENTION

A general aim of aspects of the invention is to provide a more responsive arrangement for heating and cooling the turbine casing of a gas turbine engine. This heating and cooling causes the casing and associated components to expand and contract in the radial direction respectively to control the tip clearance of the rotating blades of the turbine. This makes it possible to maintain a minimal tip clearance whilst preventing rubbing of the blades against the turbine casing, even during transient operation, to maintain a relatively high level of efficiency.

In a first aspect, the invention provides an arrangement for heating and cooling a turbine casing of a gas turbine engine, the arrangement comprising an inboard duct, adjacent to an inboard surface of the turbine casing, an outboard facing wall of the inboard duct having a plurality of impingement holes opening towards the inboard surface of the casing, through which temperature control fluid can pass from within the inboard duct to impinge upon the inboard surface of the turbine casing.

"Inboard" as used herein refers to a position that is radially closer to the axis of rotation on the turbine, whereas "outboard" refers to a position that is radially further from the axis of rotation of the turbine.

In a second aspect, the invention provides a method of radially expanding or contracting a turbine casing assembly, comprising impinging a temperature control fluid on the inboard surface of the turbine casing.

In a third aspect, the invention provides a method of radially expanding or contracting a turbine casing assembly, comprising passing a temperature control fluid through a plurality of impingement holes on the outboard facing wall of an inboard duct, the inboard duct being adjacent to the inboard surface of the turbine casing, such that the fluid impinges upon the inboard surface of the turbine casing, whereby the temperature change of the casing resulting from the impinging of the fluid causes the casing to expand or contract.

In a fourth aspect, the invention provides a turbine casing assembly, comprising the heating and cooling arrangement of the first aspect.

The invention also provides a gas turbine engine comprising the turbine casing assembly of the fourth aspect.

In all of the above aspects, the temperature control fluid is a fluid that is capable of cooling and/or heating the turbine casing. It will typically be the working fluid of the gas turbine, e.g. air in a gas turbine for aircraft and air or a steam/air mixture in an industrial turbine. The air (or other working fluid) will normally be taken from the compressor stage of the engine.

The temperature control fluid (e.g. air) may be taken from two or more locations in the engine, e.g. from two spaced apart locations in the compressor stage, at different temperatures and then mixed in selected proportions (or used alternately) to give a desired temperature for the fluid impinged on the turbine casing.

In all of the above aspects, the invention may additionally comprise an outboard duct, adjacent to the outboard surface of the turbine casing, the inboard facing wall of the outboard duct having a plurality of impingement holes opening towards the outboard surface of the casing, through which temperature control fluid (e.g. air) can pass from within the outboard duct to impinge upon the outboard surface of the turbine casing. The temperature control fluid may be from the same supply as the fluid supplied to the inboard duct.

In some embodiments comprising both inboard and outboard ducts, the outboard duct is supplied with cooler air (or other temperature control fluid) than the inboard duct. The cooler air may, for example, be from a lower pressure (and hence lower temperature) location in the engine than the location from which the supply of air to the inboard duct is taken. In this way, a desired temperature of the casing can be managed by controlling the relative flows of temperature control fluid to the inboard and outboard ducts.

In the various aspects of the invention, an inboard supply duct may be employed to deliver the temperature control fluid to the inboard duct. The turbine casing may also comprise an annular seal segment adjacent the blade tips inboard of the inboard duct, and a passage to direct a portion of the temperature control fluid after it has impinged on the turbine casing to subsequently impinge on the seal segment. As the seal segment will generally be at a higher temperature than the turbine casing, although the temperature of the fluid will rise as it cools the turbine casing, it will still have the capacity to cool the seal segment.

The turbine casing surfaces upon which the temperature control fluid impinges may be non-planar to increase the surface area against which the fluid impinges. For example, the surfaces may comprise one or more ribs, fins, strips, grooves or other protrusions or recesses.

In embodiments of the invention, the impingement holes may be angled to direct the temperature control fluid to impinge the turbine casing in a direction which is not perpendicular to the surface of the casing at the point at which the temperature control fluid strikes. The holes may be substantially circular, elliptical, elongate or any other of a number of suitable shapes.

In some embodiments of the invention, there are a plurality of inboard ducts positioned in an annular array adjacent the inboard surface of the turbine casing, each duct comprising a plurality of radial impingement holes through which temperature control fluid can be impinged on the turbine casing.

BRIEF DESCRIPTION OF THE DRAWINGS

Embodiments of the invention will now be described by way of example with reference to the accompanying drawings in which:

FIG. 5 shows two alternative sectional plan views of the arrangement of FIG. 3.

DETAILED DESCRIPTION

Figure 1:
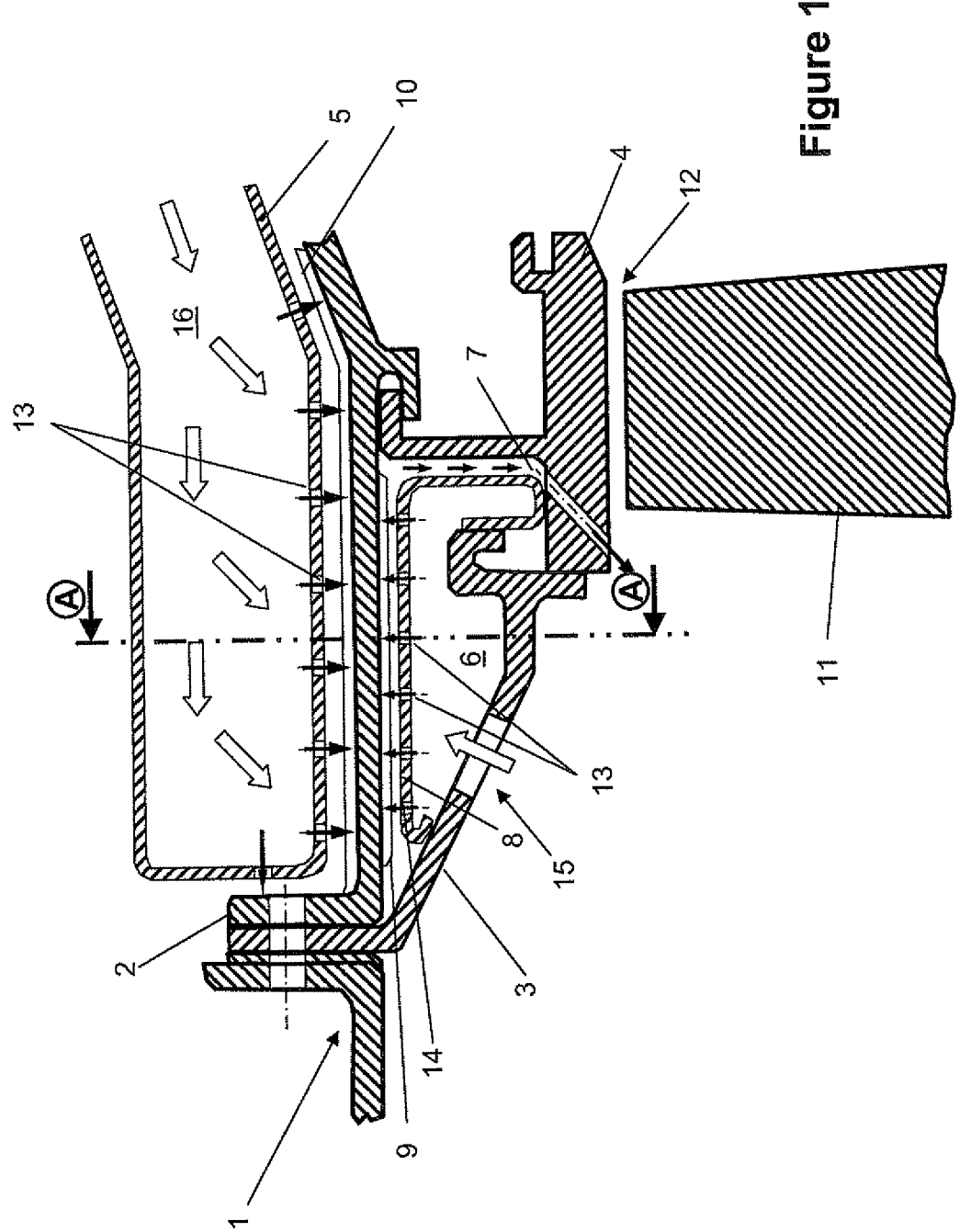
FIG. 1 shows a side elevation sectional view of an arrangement in a turbine stage of a gas turbine engine for heating and cooling the turbine casing in accordance with an embodiment of the invention.
Figure 2:
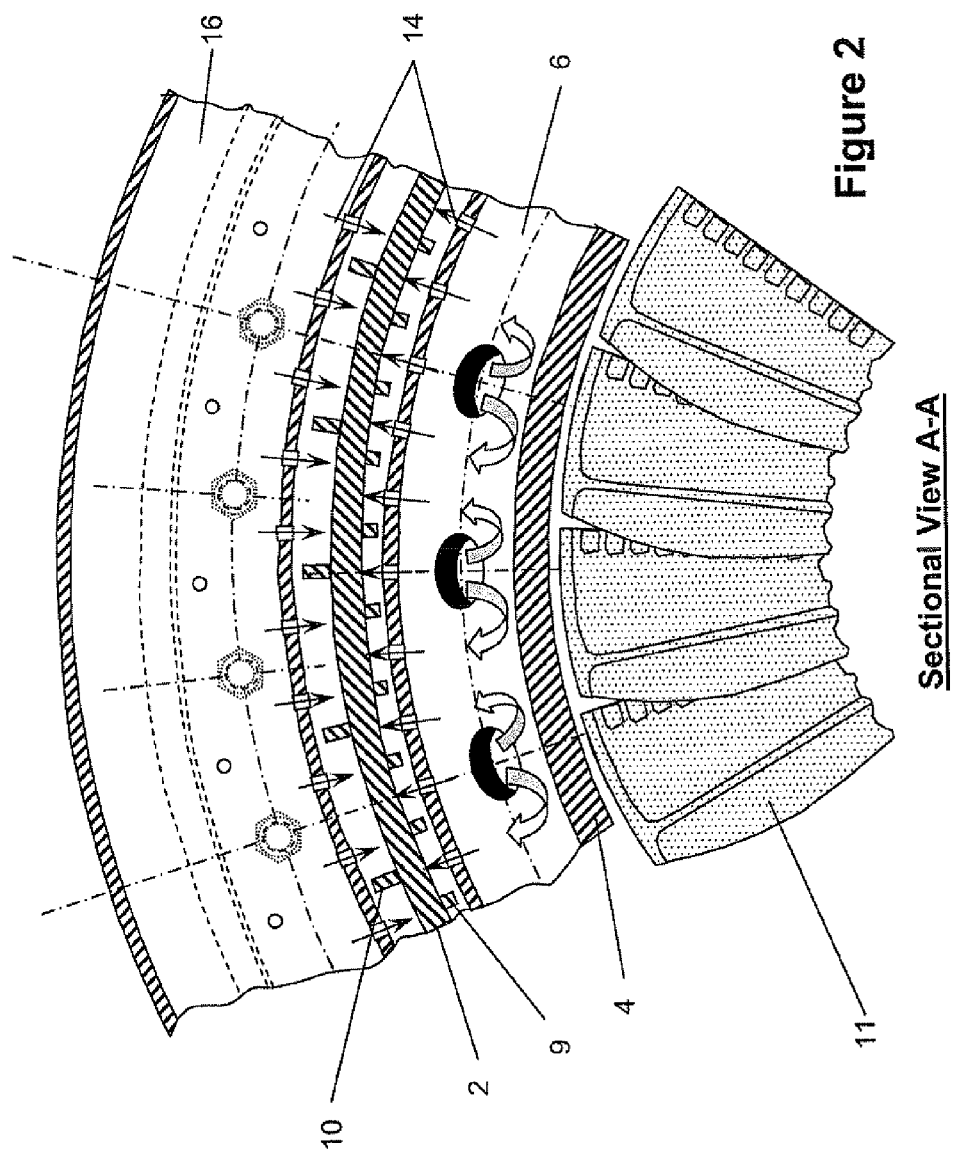
FIG. 2 shows a sectional view along line A-A of the arrangement of FIG. 1.

FIGS. 1 and 2 show a side and front elevation, respectively, of an arrangement in the turbine stage of a gas turbine engine for heating and cooling the turbine casing. With appropriate control of the heating and cooling of the turbine casing with this arrangement, the tip clearance of the turbine blades can be controlled to maintain a minimal gap, whilst avoiding rub.

In the exemplary gas turbine engine that is illustrated, the combustion casing [1] is connected to the turbine casing [2] by a flanged joint. Inboard of the turbine casing, supported on a segment support ring [3], is a seal segment [4] that faces the tips of the rotating blades [11]. In order to prevent 'over tip leakage' the tip clearance [12], i.e. the gap between the tips of the blades [11] and the seal segment [4] should be as small as possible.

In accordance with the invention, a temperature control fluid is supplied to an annular inboard duct [6] within the turbine casing. The temperature control fluid is the working fluid of the gas turbine engine itself, specifically air taken from the compressor stage of the engine.

The outboard facing wall [8] of the inboard duct [6] has a plurality of impingement holes [13], through which the temperature control fluid can pass, so as to impinge upon the inboard side of the turbine casing [2] in order to heat or cool the casing [2], dependent on whether the fluid is at a higher temperature or a lower temperature than the casing [2].

In this example, after impinging upon the inboard surface of the turbine casing [2] the impingement flow [14] circulates around the outside of the inboard duct [6] to a cavity [7] between the inboard duct [5] and the seal segment [4]. In this way, the impingement flow [14] can also be used to cool the seal segment [4].

In this example, the inboard surface of the turbine casing [2] is formed with longitudinal ribs [9] in order to increase the inboard surface area (most clearly shown in FIG. 2), and improve heat transfer between the impingement flow [14] and the turbine casing [2].

The temperature control fluid is supplied via a supply duct [15] and may be obtained from one or more locations within the engine. The fluid may be obtained from areas of different temperatures within the engine, and mixed together in varying proportions to give a desired temperature. In this example, the fluid (i.e. air) is taken from the compressor stage of the engine.

The turbine casing [2] assembly in this example also includes an outboard duct [16], around which the temperature control fluid also flows. The inboard facing wall [5] of the outboard duct [16] also contains a plurality of impingement holes [13], through which the temperature controlled fluid can pass, so as to impinge upon the turbine casing [2] in order to control its temperature, in a similar fashion to the inboard duct. The outboard surface of the turbine casing [2] is also formed with longitudinal ribs [10]) to increase its surface area to aid heat transfer (most clearly shown in FIG. 2).

Optionally, the impingement holes [13] of the inboard [6] and/or outboard [16] duct may be angled such that the impingement flow [14] will strike the surface of turbine casing [2] obliquely. This will cause the impingement flow to circulate around the surface of the turbine casing [2] to improve heat transfer.

The impingement holes [13] can be any of a number of suitable cross-sections including (for example, but not limited to) circular, elliptical, elongate, or as slot-shaped.

Using the illustrated arrangement of inboard and outboard cooling and heating ducts, the heating and cooling, and hence expansion and contraction of the turbine casing can be controlled in a more responsive manner, even during rapid acceleration or deceleration in transient manoeuvres. The enhanced cooling possible as a result of the features (e.g.

ribs) on the surfaces of the turbine casing to increase its surface area also allow a reduction in tip clearance during cruise.

2D thermodynamic analysis has shown that through a reduction in cold build tip clearance and increase contraction of the turbine casing through cooling (especially at cruise), a reduction in running clearance at cruise of up to 0.017" can be achieved, which equates to an improvement of about 1.7% SFC.

Figure 3:
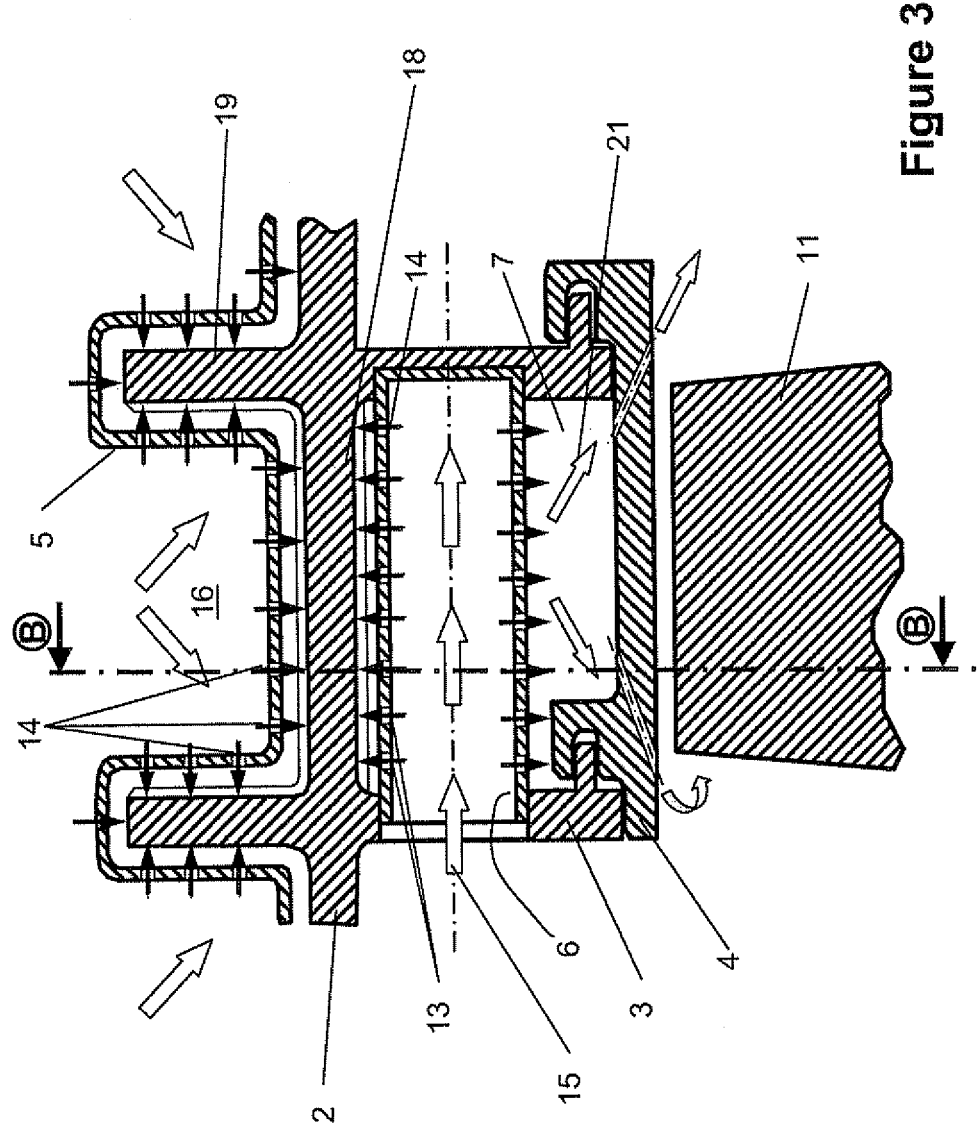
FIG. 3 shows a side elevation sectional view of another arrangement for heating and cooling the turbine casing in accordance with a further embodiment of the invention.
Figure 4:
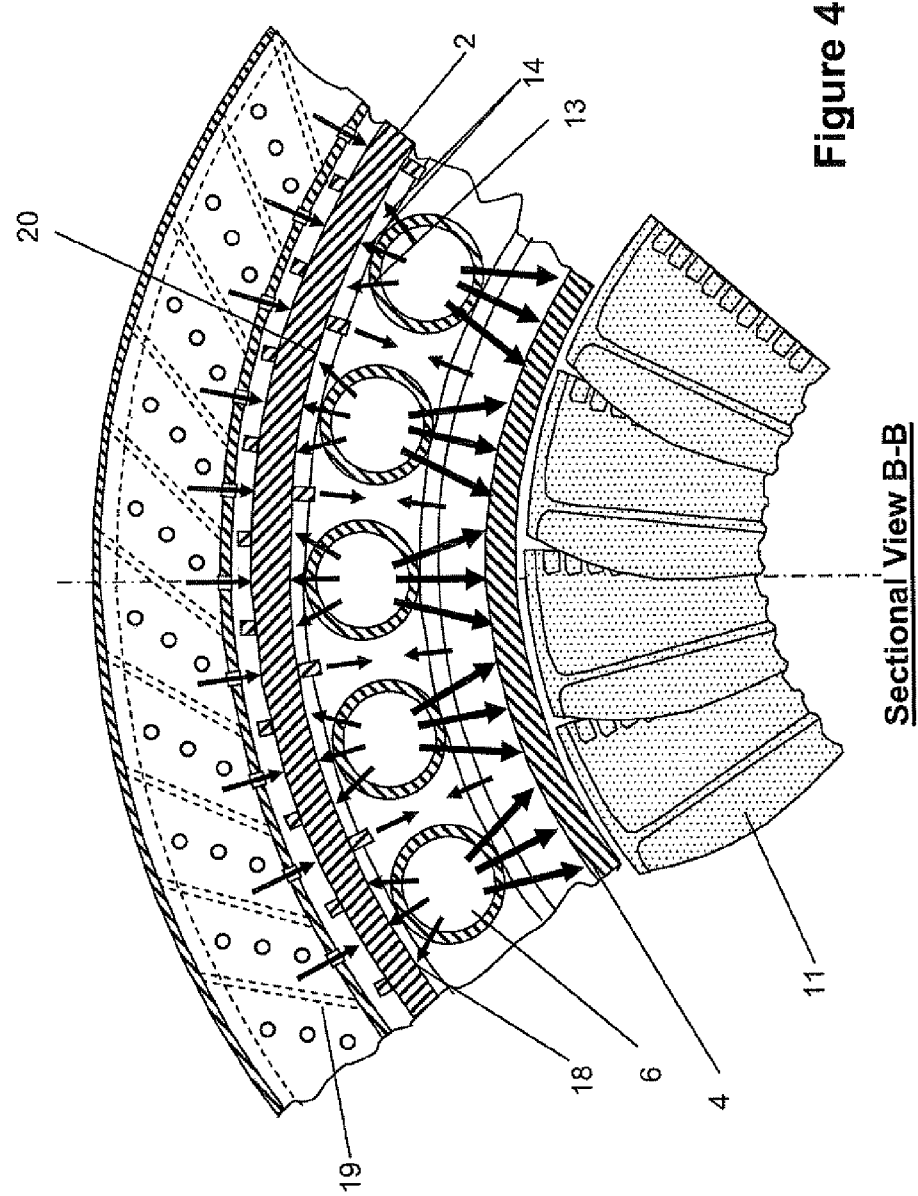
FIG. 4 shows a sectional view along line B-B of the arrangement of FIG. 3.

FIGS. 3 and 4 show a side and front elevation, respectively, of an arrangement in accordance with another embodiment of the invention. In this arrangement, temperature control fluid (e.g. air from a compressor stage of the engine) flows through the supply duct [15] into a plurality of inboard ducts [6], positioned radially about the inboard surface [18] of the turbine casing [2] (seen most clearly in FIG. 4).

In this embodiment, temperature control fluid is impinged [14] through a plurality of impingement holes [13] spaced apart circumferentially and longitudinally on the surface of each inboard duct [6]. Conveniently, each hole therefore impinges temperature control fluid at the inboard surface [18] of the turbine casing [2] at a range of angles of incidence to the casing [2] and this causes the fluid to circulate about the inboard surface [18] of the casing [2] [20] (most clearly seen in FIG. 4).

As in previous embodiments, the fluid is also subsequently used to cool the seal segment [4] by directing the fluid, after impingement on the turbine casing, between [21] the inboard ducts [6] to the seal segment cavity [7], as shown in FIG. 3.

As in the previous example, an outboard duct [5] is located adjacent to the outboard surface [17] of the turbine casing [2], around which temperature control fluid can flow. The inboard facing wall [5] of the outboard duct [16] also contains a plurality of impingement holes [13], through which the temperature control fluid can pass, so as to impinge upon the turbine casing [2] in order to control its temperature.

In this embodiment, the outboard surface of the turbine casing [2] is also fitted with enhanced cooling features (in this case axial ribs MO to increase its wetted surface area to aid heat transfer.

FIG. 5 shows two alternative plan views of the arrangement shown in FIGS. 3 and 4, clearly showing the radial arrangement of the inboard ducts [6].

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of radially expanding or contracting a turbine casing assembly, comprising; impinging a temperature controlled liquid on an inboard surface of the turbine casing, wherein the temperature control fluid is taken from two or more spaced apart locations within the gas turbine engine at different temperatures and then mixed in selected proportions to give a desired temperature for the fluid impinged on the turbine casing.

2. A method of radially expanding or contracting a turbine casing assembly according to claim 1, further comprising;
    impinging a temperature controlled liquid on an outboard surface of the turbine casing.

3. A method of radially expanding or contracting a turbine casing assembly, comprising;
    passing a temperature controlled liquid through a plurality of impingement holes on an outboard facing wall of an inboard duct, the inboard duct being adjacent to an inboard surface of the turbine casing, such that the temperature controlled liquid impinges upon the inboard surface of the turbine casing, whereby; a temperature change of the casing resulting from the impingement of the temperature controlled liquid causes the casing to expand or contract, wherein the temperature control fluid is taken from two or more spaced apart locations within the gas turbine engine at different temperatures and then mixed in selected proportions to give a desired temperature for the fluid impinged on the turbine casing.

4. A method of radially expanding or contracting a turbine casing assembly according to claim 3, further comprising;
    passing a temperature controlled liquid through a plurality of impingement holes on an inboard facing wall of an outboard duct, the outboard duct being adjacent to an outboard surface of the turbine casing, such that the temperature controlled liquid impinges upon the outboard surface of the turbine casing, whereby; a temperature change of the casing resulting from the impingement of the temperature controlled liquid causes the casing to expand or contract.

* * * * *